3,721,625
SOLID LUBRICANT COMPOSITIONS EMPLOYING POLYBENZIMIDAZOLE RESINS AND LUBRICATING PIGMENTS
Bobby D. McConnell, Dayton, Ohio, Melvin T. Lavik, Kansas City, Mo., and Mahlon E. Campbell, Merriam, Kans., assignors to the United States of America as represented by the Secretary of the Air Force
No Drawing. Filed June 11, 1968, Ser. No. 736,009
Int. Cl. C10m 5/22, 5/26
U.S. Cl. 252—12          6 Claims

ABSTRACT OF THE DISCLOSURE

Solid lubricant compositions employing polybenzimidazole resins (PBI) and lubricating pigments are produced by admixing finely divided lubricant pigments into a solution of polybenzimidazole resin and solvent therefor. For example, a solid lubricant composition is produced by dissolving powdered polybenzimidazole in N-methylpyrrolidine to form a solution of about 25 weight percent solids to which is added about 75 weight percent of the solid lubricant pigment comprising a mixture of molybdenum disulfide ($MoS_2$) and antimony trioxide ($Sb_2O_3$). The resulting slurry is sprayed onto the surface of a test specimen and the wetted test specimen is placed into an oven where it is dried at 200° F. for one hour. It is then heated at 575° F. for one hour to effect cross-linking and bonding to specimen surface. Other solid lubricant pigments which may be used include molybdenum diselenide, graphite, tungsten disulfide, tungsten diselenide and the like.

Alternatively, the PBI composition can be laminated with fibers of glass, graphite and the like to make preformed structures which can be machined to fit against the metal surface to be lubricated. Fiber glass or graphite fiber reinforced bearing components are formed utilizing the PBI composition as a binder for the fibers as well as for the lubricating pigment.

The invention herein described may be manufactured and used by or for the United States Government for government purposes without payment to us of any royalty thereon.

BACKGROUND OF THE INVENTION

This invention deals with solid film lubricant compositions and more particularly is directed toward bonding agents with improved properties for use with solid lubricant pigments at high temperatures. A lubricant pigment is defined as a dry, solid, material which provides lubrication between two relatively moving surfaces. A solid lubricant composition is defined as the mixture of solid lubricant pigments, binder, additives, etc., which is applied to the surface to be lubricated.

There are a number of solid lubricant pigments which are well known in the art. Examples of such lubricants are molybdenum disulfide, molybdenum diselenide, graphite, antimony trioxide, tungsten disulfide and tungsten diselenide. It is also well known in the art that such solid lubricants can be mixed with binders such as phenolic, epoxy, acrylic, silicone or phenolic-epoxy resins; the binder serving partly to hold the lubricant particles together and partly to improve the adherence of the particles to the metal substrate surface requiring lubrication. The use of such resin bonded solid lubricants has been quite successful at relatively low temperatures but the limited thermal stability of such resins has limited their usefulness in aerospace mechanisms. Specifically, such binders are not thermally stable above about 450° F. In order to improve the thermal stability of solid lubricant compositions, ceramics have been suggested as bonding materials. The use of ceramics, however, has not permitted the use of solid lubricant compositions at temperatures in the range of 500°–1000° F. because of the fact that ceramics become hard, abrasive, and brittle in this range.

OBJECTS

It is, therefore, an object of this invention to provide lubricant compositions comprising a powdered solid lubricant pigment and a suitable binder which is adapted for satisfactory long term use in the temperature range of 500°–1000° F. for many applications wherein operation is now, at best, marginal with the presently used organic resin and inorganic bonded solid film lubricants.

It is also an object of the invention to provide a method of applying and preparing a solid film lubricant on a metal surface, said film having superior thermal and oxidative stability at temperatures in excess of 500° F. and having improved friction and wear properties at ambient temperatures as well as at elevated temperatures.

It is a further object to provide for the preparation of laminates of bonded solid lubricants with fiber glass, graphite fibers and the like to make preformed structures which can be machined to fit against a metal surface to be lubricated.

It is a still further object to provide a lubricant composition useful in the forming of a solid lubricant film with both improved wear life and improved adhesive properties.

SUMMARY OF INVENTION

We have now found that the foregoing and related objects can be attained in a solid film lubricant composition which comprises a solid lubricant pigment and a binder therefor, wherein the improvement comprises, as said binder, a polybenzimidazole. We have found that the polybenzimidazole can be dissolved in a suitable solvent and can be made into a slurry with the solid lubricant pigment, that the slurry can be applied to the metal surface to be lubricated, that the drying of the slurry can be effected, and the composition can be cured at an elevated temperature. Alternatively, the composition of the invention can be laminated with fiber glass or other suitable, heat stable material to form preformed laminate structures which can be machined to fit against the surface to be lubricated.

Polybenzimidazoles can be made, for example, by the reaction of 3,3'-diaminobenzidine with diphenyl isophthalate and by the reaction of 3,3'-diaminobenzidine with isophthalamide. Polybenzimidazoles can be prepared in the manner set forth in U.S. Pat. No. 3,174,947 issued to C. S. Marvel. Polybenzimidazoles suitable for use in the composition of the invention have the following structure, when $n$ has a value of at least 2;

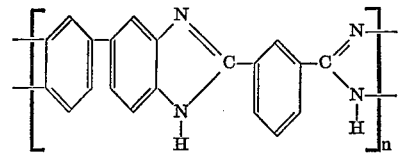

The polybenzimidazole as obtained commercially is usually in bulk or powdered form and usually relatively uncured. It can be dissolved in a suitable solvent such as N-methylpyrrolidine, dimethylacetamide, pyridine, or the like. After preparing a suitable solution (for example, 25% solids) with the dissolved polymer, the solid lubricating material is mixed into the solution by stirring. The proportion of solvent is adjusted to obtain a thin creamy slurry (about 40–60% solids) which can be sprayed, brushed, dipped, or otherwise applied to a metal substrate surface. A thin uniform coating of approximately 0.0002–0.0005 inch in thickness is most desirable for best results.

The slurry on the metal surface is allowed to air dry and the specimen is then placed in a suitable oven for curing of the binder. Curing times and temperatures are selected to complete the evaporation of the solvent at relatively lower temperatures and to complete cross-linking and complete curing of the polymer at relatively higher temperatures. A suitable lower temperature at which the evaporation of the solvent can be completed is at 200° F. for about one hour. A suitable high temperature for complete curing of the polymer is about 575° F. for about one hour.

We have found that in order to attain improved adhesive properties of the lubricant film to a metal surface, to insure adequate bonding of the polymer to the powdered lubricant, and at the same time to maintain low friction and wear, the polybenzimidazole binder should be present in the composition in a proportion of about 25-35 percent by weight of the proportion of powdered solid lubricant pigment.

EXAMPLE

Powdered polybenzimidazole was dissolved in N-methylpyrrolidine. A mixture of antimony trioxide and molybdenum disulfide was added to the solution with stirring until a sprayable mixture was obtained. The resulting composition comprised one part by weight polybenzimidazole, one part by weight antimony trioxide, and three parts by weight molybdenum disulfide. The resulting slurry was sprayed onto both the pin and the four pressure points of a Falex test machine. The pin and pressure points, wetted with the slurry, were put into an oven where they were dried at 200° F. for one hour and then heated at 575° F. for one hour. The lubricant-coated pin and pressure points were then placed in the Falex test machine. In the latter machine a rotating pin rubs against four pressure points. The pressure applied against the pin, the speed of rotation of the pin, and the temperature can be varied. Failure of the lubricant is signaled by a rapid rise in torque on the pin. A lubricant is considered not acceptable if it fails to go sixty minutes before the rapid rise in torque. In a first test run of our new composition the load was 1000 pounds, the speed of rotation of the pin was 290 r.p.m., and the temperature was ambient. The average wear life of the solid film lubricant composition in the test was 180 minutes. A series of six such tests were also run and a wear life as high as 450 minutes was recorded. In a similar series of five tests run at 800 pounds pressure, 100 r.p.m. and a temperature of 600° F. wear periods as high as 63 minutes were obtained.

The composition described above was also subjected to test in a rub shoe machine. In the latter test a disc with a lubricant coated edge, following drying and curing of the binder, is rotated between two pressure loaded shoes. The tests were run under vacuum at a load of 100 pounds and at a disc speed of 500 r.p.m. The temperature was varied. At ambient temperatures we obtained wear life as high as 267.5 minutes. At 300° F. we obtained wear life as high as 197.5; at 400° F. as high as 149 minutes; at 500° F. as high as 305 minutes; and at 1000° F. as high as 28.1 minutes. In some of our tests the limiting factor was not the binder but rather the powdered solid lubricant. For example, in tests including molybdenum disulfide at temperatures above 700° F. oxidation of the molybdenum disulfide was the limiting factor.

The compositions of the invention are expected to find maximum utility when used in aerospace mechanisms, particularly in high speed aircraft parts which reach high temperatures due to aerodynamic friction.

It is to be understood that while specific examples describe preferred embodiments of our invention, they are for the purpose of illustration only, that the products and methods of the invention are not limited to the precise details and conditions disclosed, and that various changes may be made therein without departing from the spirit of the invention which is defined by the following claims.

What is claimed is:

1. A lubricant composition which is thermally stable at temperatures in the range of 500 to 1000° F., and which has improved adhesive properties to a metal surface, said composition consisting of a mixture of molybdenum disulfide and antimony trioxide as a solid lubricant pigment and, as a binder therefor, a polybenzimidazole, the amount of said binder in said composition being about 25 to 35 weight percent of said solid lubricant pigment.

2. The composition according to laim 1 wherein said polybenzimidazole is in solution in a solvent selected from the group consisting of N-methylpyrrolidine, dimethylacetamide and pyridine and said composition is in the form of a sprayable mixture.

3. The composition according to claim 1 wherein said polybenzimidazole is present in its cured form.

4. The composition according to claim 1 wherein said composition is in the form of a film.

5. A method of forming a solid lubricant film which comprises the steps of:
   (1) dissolving a polybenzimidazole in a solvent selected from the group consisting of N-methylpyrrolidine, dimethylacetamide and pyridine;
   (2) adding a mixture of molybdenum disulfide and antimony trioxide as a powdered solid lubricant to the resulting solution, thereby forming a slurry of said lubricant in said solution, the amount of polybenzimidazole being about 25 to 35 weight percent of the amount of said lubricant;
   (3) adjusting the amount of solvent so that said slurry contains about 40 to 60 weight percent solids;
   (4) applying said slurry as a coating to a surface to be lubricated;
   (5) drying said coating so as to remove solvent from said slurry; and
   (6) heating said coating so as to evaporate any remaining solvent and cure said polybenzimidazole, thereby forming a solid lubricant film adherent to said surface.

6. The method according to claim 5 wherein said coating is air dried, then heated to about 200° F. for about one hour, and then to about 575° F. for about one hour to complete said curing.

References Cited

UNITED STATES PATENTS

| | | | |
|---|---|---|---|
| 3,097,338 | 2/1963 | Cawbet | 252—12 |
| 3,174,947 | 3/1965 | Marvel et al. | 260—47 |
| 3,314,885 | 4/1967 | Murphy, Jr. | 252—25 |
| 3,453,208 | 7/1969 | Gallagher et al. | 252—12 |
| 3,014,865 | 12/1961 | Seniff et al. | 252—12 |
| 3,433,742 | 3/1969 | Banta | 252—12 |
| 3,652,408 | 3/1972 | Korshak et al. | 252—12 |

CARL F. DEES, Primary Examiner